United States Patent [19]

Wallis

[11] Patent Number: 4,464,555

[45] Date of Patent: Aug. 7, 1984

[54] TORCH, USEFUL IN AIR-CARBON ARC PROCESSES

[76] Inventor: Roger Wallis, 42 Manor Park Dr., Sheffield 2, England

[21] Appl. No.: 377,218

[22] Filed: May 11, 1982

[30] Foreign Application Priority Data

May 13, 1981 [GB] United Kingdom ............ 8114635

[51] Int. Cl.³ .................... B23K 9/16; B23K 9/28
[52] U.S. Cl. .................... 219/69 R; 219/138; 219/70
[58] Field of Search ............ 219/68, 69 R, 138, 70

[56] References Cited

U.S. PATENT DOCUMENTS

| | | | |
|---|---|---|---|
| 3,113,201 | 12/1963 | Stepath | 219/70 |
| 4,300,033 | 11/1981 | Scarton et al. | 219/69 R |
| 4,315,126 | 2/1982 | Schaefer et al. | 219/70 |

Primary Examiner—Roy N. Envall, Jr.
Assistant Examiner—Catherine M. Sigda
Attorney, Agent, or Firm—Caesar, Rivise, Bernstein & Cohen, Ltd.

[57] ABSTRACT

A torch, useful in air-carbon arc processes has a holder (9, 11) for an electrode (E) and gas control means comprising a venturi air injector (4), arranged to pass both compressed air (F) and induced air (Fi) along the electrode to the tip (Et) to cool the electrode, increase the rate of removal of metal and reduce consumption of electrode and compressed air.

7 Claims, 5 Drawing Figures

TORCH, USEFUL IN AIR-CARBON ARC PROCESSES

This invention relates to a torch useful particularly but not exclusively in air-carbon arc processes. One such process for removing metal involves striking an arc between a carbon electrode and the work-piece. This forms a pool of molten metal which is blown from the workpiece surface by air jets directed along the length of the electrode. The air jets also tend to cool the electrode. The process can remove metal at very high rates and is used widely throughout the steel foundry industry. Unfortunately, there is much noise, heat, and fume. Because the air jets do not cool sufficiently, the electrode is at a very high temperature and it tends to break down very rapidly. For this reason the electrode constitutes a high proportion of the cost of the operation.

One object of the invention is to provide an improved torch for the purpose specified and which reduces or avoids the disadvantages outlined above.

According to one aspect of the invention there is provided a torch comprising an elongate electrode in a holder therefor and means for providing a stream of gas at least at the tip of the electrode, in which gas control means is arranged to provide a substantially annular flow of gas along the electrode.

The gas control means is preferably a venturi-like injector located about part of the length of the electrode. The venturi-type air injector may be separately applied to the electrode but it is preferred that the venturi-type air injector is combined with an electrode holder arranged so that the electrode will be concentric with the injector. While the internal shape of the gas control means may be a divergent or convergent bore, it is preferred that the inner walls of the means be substantially parallel.

Any suitable gas may be passed along the electrode to cool it; in practice it will usually be air with an appropriate air supply connected to an inlet of a venturi type air injector. Preferably compressed air is emitted through an annular gap positioned relative to the throat of the venturi so as to induce an air flow through the injector. The volume flow rate of the induced air flow is many times greater than that of the compressed air alone, and will be maintained as a coherent stream to the tip of the electrode. Air velocities and hence noise levels will be less than those experienced on a conventional torch but total mass flow rate of induced+driven air is much higher. As a result and according to the invention, the metal removal rates and the ability to cool the electrode are increased resulting in more efficient electrode usage.

Preferably the torch is hand held and for this the torch includes a handle. In a much preferred feature, the supply of gas to the gas control means and along the electrode is located in the handle; this serves to cool the handle and lighten the overall weight of the tool.

Most preferably the torch is arranged such that the handle incorporates an electrode clamp which is movable through 180° relative to the rest of the torch making it easier to angle the electrode relative to a workpiece.

While the invention has been described with reference to the air-carbon arc process useful for removing metal from workpiece it will be appreciated that the invention may be used in other situations where an arc is struck and there is a need to reduce the noise.

The invention further includes a method of striking an arc between a carbon electrode and a work-piece and including providing a stream of gas at least at the tip of the electrode, in which, according to the invention, the stream of gas is a substantially annular flow along the electrode.

A torch of this invention has proved to be much quieter in use than a known torch, probably because the high frequency components of the air noise are reduced. A torch of this invention uses compressed air at the same pressure as a known torch but the rate of consumption is far less. The rate of removing metal from a workpiece is improved compared with a known torch: increases of up to 25% in terms of grams metal removed per unit time have been achieved and similar improvements have been obtained in electrode consumption at the usual rate of metal removal.

In order that the invention may be well understood it will now be described with reference to the accompanying diagrammatic drawings, in which.

Figure 1:
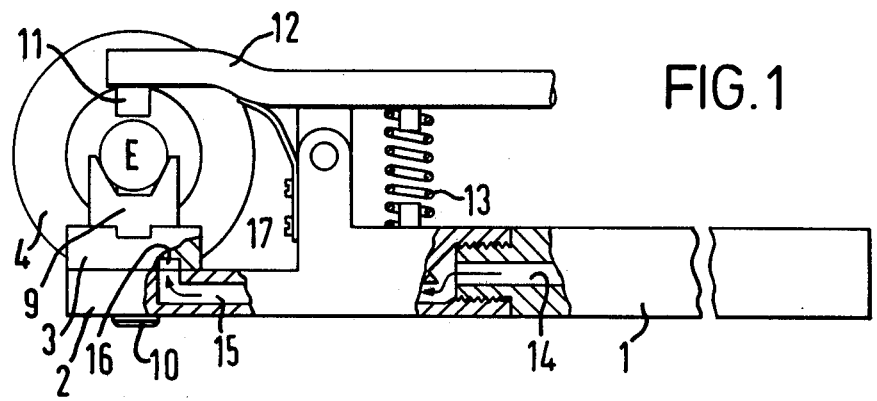
FIG. 1 is an end elevation partly in section of a torch of the invention.
Figure 2:
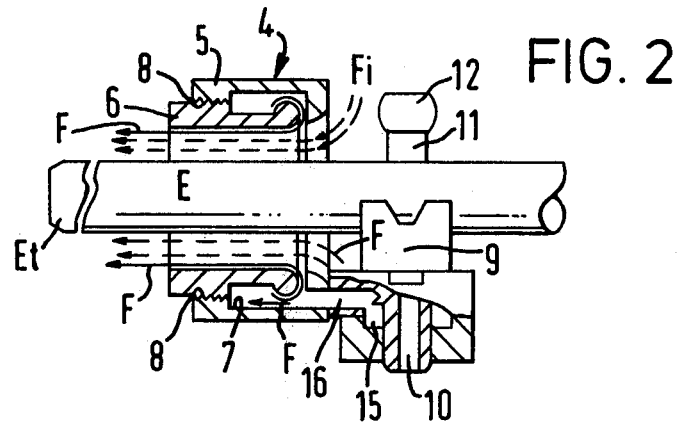
FIG. 2 is a sectional view of part of the torch of FIG. 1 illustrating the air flow characteristics.

The torch of FIGS. 1 and 2 includes a handle 1. The head of the handle is connected to a coupling 2 which engages an index plate 3. At one side, the left hand side as seen in FIG. 2, the plate 3 is connected to the inlet side or throat of a venturi air injector 4 of generally known type. The injector comprises an outer annulus 5 and an inner annulus 6, with a small enclosed chamber 7 inbetween; the inner annulus 6 may be moved longitudinally with respect to the outer 5 by a screw thread 8 to adjust the gap in between. A first clamp half 9 for the electrode E e.g. a carbon electrode, has a shank 10 which passes through the index plate 3 and the head of the handle 1; a second clamp half 11 is mounted on the end of a cranked handle 12 pivotally mounted on the first handle 1. The clamp halves 9, 11 are urged towards each other under the bias of a strong spring 13 between the handles 1, 12.

The index plate 3 includes two grooves, not shown, arranged at right angles to each other. The grooves are of different depths and the clamp half 9 can be rotated with respect to the plate 3 so that two different electrode diameters can be positioned in the clamp half and concentric with the air injector 4.

The handle 1 has an air passageway 14 which communicates with another 15 in the coupling 2 and a third 16 in the index plate 3. The passageway 16 defines a small annular gap close to the throat of the injector 4 so directing compressed air into the injector 4. Electrical wiring 17 extends along the handle 1 via the coupling 2 to the clamp halves 9, 11. The coupling 2 and the index plate 3 are electrically insulated.

In use, an electrode E is held between the clamp halves 9, 11 and in this way is positioned concentric with respect to the injector 4. Compressed air is fed along the handle 1 in the passageway 14 and via the passageways 15, 16 into the throat of the injector 4. As the compressed air F passes into and through the injector, an additional air flow Fi is induced through the rear of the injector 4 and the total air of compressed and induced air flows as a coherent stream along the length of the electrode E to the tip Et. An arc is struck between the tip Et and a workpiece, not shown, and the pool of metal is blown off by the total air flow. The total air flow cools the electrode along its length and also the clamp halves which tend to get hot as very high electrical currents are often used. There is little noise, fume or metal splatter; the rate of consumption of electrode and compressed air are reduced.

Figure 3A:
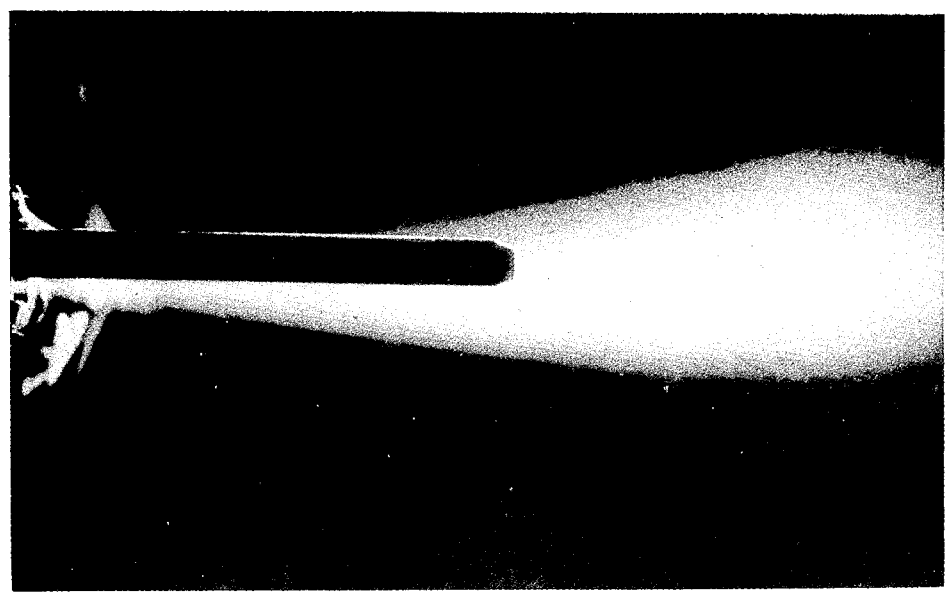
FIG. 3A is a photograph showing the air flow pattern of a known torch and FIG. 3B is the same for the torch of FIG. 1.
Figure 3B:
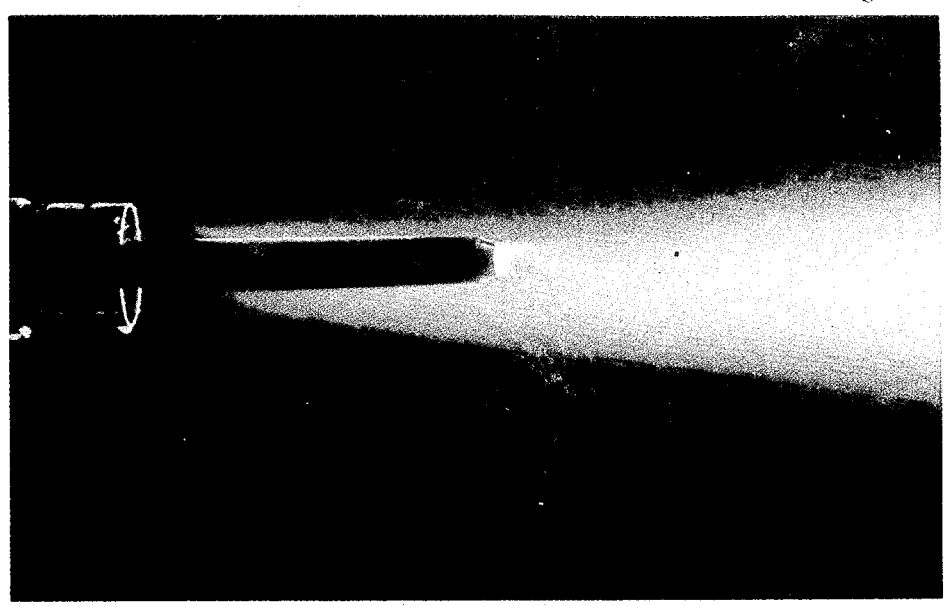

In a series of evaluations photographs were taken of a conventional torch comprising a valveless torch having 3 air ports each 3 mm in diameter and operating at 90 psi and of the torch of FIGS. 1 and 2 in use and representative results are shown in FIGS. 3A and 3B respectively. It will be observed that although the air in the conventional torch is supplied from the rear of the electrode, the air flow impinges on one side and tip of the electrode only. In the case of the torch of the invention the total air flow i.e. induced + driven is much greater and tends to surround the electrode. As a result, the electrode is much more efficiently cooled and the rate of consumption of the electrode is substantially reduced. Also, the rate of consumption of compressed air is substantially reduced.

Figure 4:
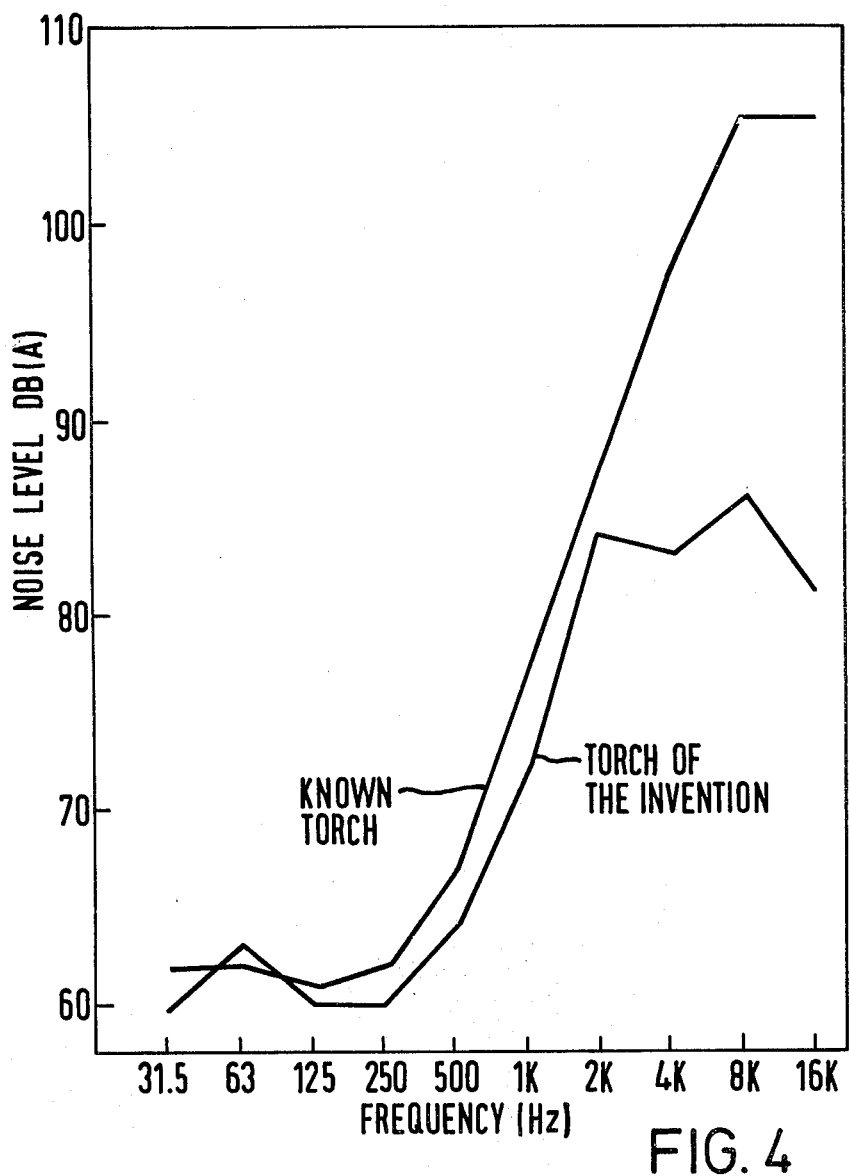
FIG. 4 is a graph showing noise levels using a known torch and a torch of the invention.

In a second series of evaluations the two torches were tested for octave band sound pressure levels. All measurements were taken one meter to the side of the head position adopted by an operator in compliance with the British Department of Employment "Code of Practice for reducing the exposure of employed persons to Noise" HMSO: London, 1972. The results obtained are shown in the graph of FIG. 4. It will be seen that the torch of the invention drastically reduces the high frequency components of the air jet noise indicating a 24 dB(LIN) reduction at 16 kHz. It is postulated that in the case of the invention, the sound reduction is achieved because the use of induced air allows lower air velocities to be used and the air is transmitted to the electrode tip in a much more aerodynamically efficient manner.

I claim:

1. A torch comprising an elongate electrode having a tip, said electrode being mounted in a holder therefor, and means for providing a stream of gas at least to the tip of the electrode, gas control means to provide a substantially annular flow of gas along the electrode, said gas control means comprising a venturi-type injector means, and being arranged to supply to said electrode tip a flow of compressed gas and induced gas where the volume of the induced gas is several times greater than that of the compressed gas.

2. A torch according to claim 1 in which the injector means has two annuli, one being movable relative to the other.

3. A torch according to claim 1, in which the gas is supplied to the gas control means through a handle for the torch.

4. A torch according to claim 3, in which the electrode holder is rotatable relative to the torch.

5. A torch according to claim 1, in which the electrode holder is located adjacent the handle such that the flow of induced gas is caused to pass and cool the holder.

6. A torch according to claim 1, in which the holder for the electrode comprises two clamp halves, one of which is mounted on an index plate connected to the gas control means and a handle of the torch, the index plate having a passageway to pass compressed gas from the handle to the gas control means.

7. A torch according to claim 1, in which the injector means includes an outer annulus and an inner annulus with a small enclosed chamber formed therebetween, the inner annulus being positioned closely adjacent said electrode whereby said flow of compressed gas and induced gas passes between said inner annulus and said electrodes as a coherent stream toward the tip of said electrode.

* * * * *